Nov. 25, 1941.   R. C. HINTON   2,263,628

ADJUSTMENT TOOL FOR INDIVIDUAL FRONT WHEEL SUSPENSIONS

Filed Nov. 1, 1939

INVENTOR
ROBERT C. HINTON
BY HARRIS, KIECH, FOSTER & HARRIS

FOR THE FIRM
ATTORNEYS.

Patented Nov. 25, 1941

2,263,628

UNITED STATES PATENT OFFICE 2,263,628

ADJUSTMENT TOOL FOR INDIVIDUAL FRONT WHEEL SUSPENSIONS

Robert C. Hinton, Santa Barbara, Calif.

Application November 1, 1939, Serial No. 302,333

7 Claims. (Cl. 153—32)

My invention relates to tools for servicing and repairing automotive vehicles, with special reference to the front wheel suspensions of such vehicles, and is directed specifically to a tool for varying the camber of a front wheel as determined by the front wheel suspension linkage.

An articulated assemblage of members constituting an individual suspension for a front wheel of an automobile, a combination that is commonly termed "knee-action," includes a steering-knuckle support that is integral with one of the relatively movable parts of the steering-knuckle, and includes upper and lower suspension arms that extend from the frame of the car to the upper and lower ends respectively of the steering-knuckle support. Since the inclination of the front wheel spindle is fixed relative to the steering-knuckle on which it swings, and since the steering-knuckle in turn has a fixed relation to the steering-knuckle support, it is apparent that the camber of the front wheel depends upon the disposition of the steering-knuckle support.

An individual suspension linkage as manufactured is designed for approximately correct camber of the front wheel, and a small degree of adjustment in camber is commonly provided by incorporating an adjustable eccentric in the articulated joint at one end of the steering-knuckle support. Over long periods of operation, however, the proper camber of the independently suspended front wheels may be lost, especially under rough service, and, of course, even a minor traffic accident may throw a front wheel radically out of its intended camber. Quite frequently the degree of adjustment required to restore the camber of a front wheel is beyond the corrective capacity of the eccentric or such other variable means as may be incorporated in the suspension linkage, and the garage mechanic is then confronted with the problem of changing the disposition of the steering-knuckle support by some other expedient. The usual remedy, and the remedy to which this invention is directed, is to bend the steering-knuckle support to tilt the steering-knuckle toward one side or the other of the car.

For at least two good reasons it is not practical to dismantle the suspension linkage for the purpose of performing a bending operation on the steering-knuckle support at a work bench. In the first place, considerable labor is involved in dismantling and reassembling the suspension linkage. In the second place, in such a procedure the correct adjustment would be found by trial and error necessitating repetitive dismantling and reassembling of the suspension linkage. There is, then, a definitely recognized need for some simple and efficient tool to adjust the disposition of the steering-knuckle support by bending the support without dismantling the suspension linkage in which the steering-knuckle support is incorporated.

The design of such an adjustment tool involves a number of difficult problems because of the following considerations: the tool must be dimensioned and shaped to pass into and out of the restricted clearance around a functioning steering-knuckle support; the tool must be adapted for convenient manipulation and operation, notwithstanding the associated front wheel and other hindrances to a free approach to the steering-knuckle support; the tool must be capable of exerting relatively great bending force and yet be of relatively small dimension; the tool should be capable of bending the steering-knuckle support toward either side of the car so that the camber of the associated wheel may be either increased or decreased; and the tool should be adapted to fit and adjust steering-knuckle supports of various cross-sectional dimensions incorporated in the various specific types of "knee-action" linkages. The object of my invention is to meet all these difficulties in the provision of a simple, efficient, and rugged tool adapted for universal use in adjusting steering-knuckle supports. This inclusive object and the more specific objects that it encompasses will be understood from the following detailed description taken with the accompanying drawing.

In the drawing, which is to be taken as illustrative only:

Figure 2:
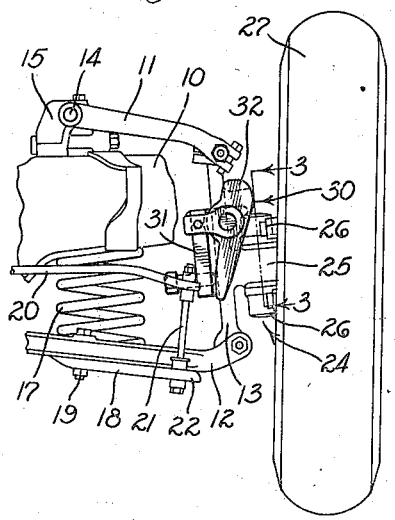
Fig. 2 is a front elevation on a reduced scale of an individual front wheel suspension showing my tool applied to the steering-knuckle support in the suspension.
Figure 1:
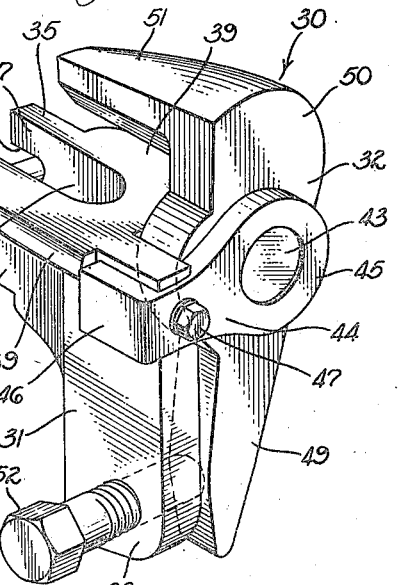
Fig. 1 is a perspective view of my adjustment tool.

The tool shown in Fig. 1 is adaptable to the various types of front wheel suspension linkages that are prevalent, and Fig. 2 shows the tool as employed in adjusting one of these types of front wheel suspension.

Fig. 2 shows a portion 10 of an automobile frame on which the suspension linkage is mounted. The suspension linkage includes upper and lower suspension arms 11 and 12 respectively that are pivotally connected to the opposite ends of a steering-knuckle support 13. The two upper suspension arms 11, of which only one is visible as viewed in Fig. 2, are mounted on the shaft 14 of a shock absorber 15, and the lower suspension arms 12 are connected to the frame 10 by a simple pivot (not shown). The usual vertical coiled spring 17 that acts between the frame 10 and the lower suspension arms 12 is shown resting upon a seat member 18 that is attached to the suspension arms 12 by suitable bolts 19. Associated with the front wheel linkage is a front ride stabilizer comprising a transverse bar 20 and connected to each of the ends thereof is a short rod 21 extending upwardly from the lower suspension arms 12. As indicated in Fig. 2, each of the short rods 21 may be conveniently mounted on an extension 22 of the seat member 18.

The steering-knuckle support 13 is integral with one of the coacting parts of a steering-knuckle that is generally designated by numeral 24. In the particular arrangement illustrated in the drawing the steering-knuckle 24 includes a central portion 25 that is integral with the steering-knuckle support 13, and includes two end portions 26, both of which end portions are integral with the spindle (not shown) on which the front wheel 27 is mounted.

The problem presented is that of providing a tool that will bend the steering-knuckle support 13 in situ, and the tool that carries out the required task is best shown in Fig. 1.

Figure 4:
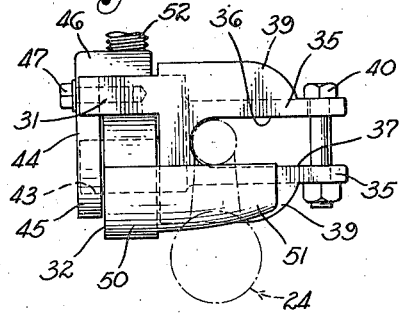
Fig. 4 is a top view of the arrangement shown in Fig. 3.

The tool, generally designated by numeral 30, comprises a body 31 preferably of cast steel on which a bending lever 32 is mounted. The body 31 of the tool is adapted to lie adjacent to and longitudinally of the steering-knuckle support 13 and is preferably angular in cross-sectional configuration in that it has a reinforcing wings 33. The body 31 includes a pair of spaced engagement arms 35 integral therewith that defines an engagement recess 36 dimensioned to receive the steering-knuckle support 13. Preferably the opposed faces 37 of the two engagement arms 35 are slightly divergent, as indicated in Fig. 4, whereby the arms may rigidly engage steering-knuckle supports of various cross-sectional dimensions, the supports of smaller cross section being engaged at the inner end of the recess 36, as indicated in Fig. 4, and supports of larger cross-sectional dimension being engaged at points spaced outward from the inner end of the engagement recess. To achieve the required rigidity in the engagement of the tool with a steering-knuckle support, the two engagement arms 35 should be of substantial depth for extensive longitudinal contact.

The tool is adapted to be applied to the steering-knuckle support from either the front or the rear so that it may be employed to bend the steering-knuckle support in either lateral direction; it is desirable, therefore, that each of the two engagement arms 35 be shaped and dimensioned to pass into the space between the steering-knuckle support 13 and the associated steering-knuckle 24. One of the features of my invention is that I provide a tool with engagement arms of the restricted dimensions required and yet achieve the necessary strength in those arms to withstand the relatively high stresses involved in the bending operation. In this regard it will be noted, as best shown in Fig. 1, that each of the engagement arms 35 has a relatively thin vertical portion 38 and a laterally extending reinforcing web 39, and that, if desired, the two engagement arms may be inter-connected at their outer ends by suitable means such as a bolt 40 that fits into end recesses 41. The bolt 40 resists stresses tending to spread the two engagement arms 35 apart and is especially desirable if the tool is applied to a steering-knuckle support of such large diameter as to be engaged toward the outer ends of the engagement arms. The vertical portion 38 of each of the engagement arms is dimensioned to fit between the steering-knuckle support 13 and the upper end portion 26 of the steering-knuckle 24, and when the engagement arm is so positioned the reinforcement web 39 rests upon the top of the end portion 26 of the steering-knuckle.

Extending from the tool body 31 and preferably integral therewith is a spindle 43 upon which the bending lever 32 is rotatably mounted. The bending lever 32 may be retained on the spindle 43 in any suitable manner, but I prefer to employ for such purpose a keeper 44, especially since a keeper constructed as shown resists bending stress by bracing the outer end of the spindle. The keeper 44, which may be fabricated from a steel plate, includes an aperture portion 45 that closely embraces the end of the spindle and a flange 46 that engages the outer face of the body reinforcing wing 33. The tool body 30 may be cut away, as indicated in Fig. 1, to seat the keeper 44 and the keeper may be retained on the body by suitable means such as a cap-screw 47.

The bending lever 32 has a downwardly extending arm 49 and an upwardly extending arm 50 with a lateral extension 51 disposed in the direction of the two engagement arms 35. Preferably the downwardly extending arm 49 is substantially longer than the upper arm 50 to achieve favorable leverage in the operation of the tool. The lateral extension 51 is adapted to swing from a position above one of the engagement arms 35 across the engagement recess 36 toward a position above the other engagement arm, and the lateral extension 51 is of sufficient lateral dimension to act upon steering-knuckle supports positioned at various depths of the engagement recess 36.

Any suitable means may be employed to actuate the lever 32 for a bending operation. In the preferred form of my invention I employ simply a coarse-threaded cap-screw 52 that may be mounted in either the tool body 31 or the lever 32 to act between the body and the lever. Preferably, as indicated in the drawing, the cap-screw 52 is threaded into the reinforcing wing 33 of the body in a position for screw movement against the lower end of the downwardly extending arm 49 of the lever.

Figure 3:
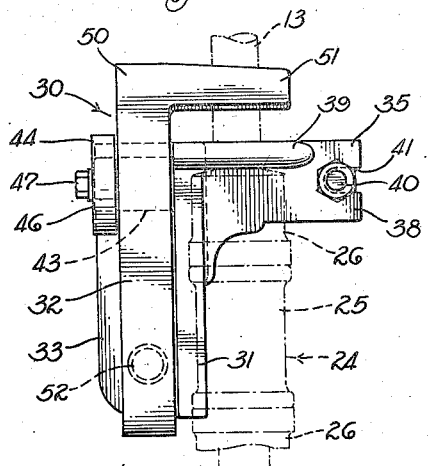
Fig. 3 is a side elevation on a somewhat enlarged scale taken as indicated by the line 3—3 of Fig. 2, the steering-knuckle being shown in phantom.
Figure 5:
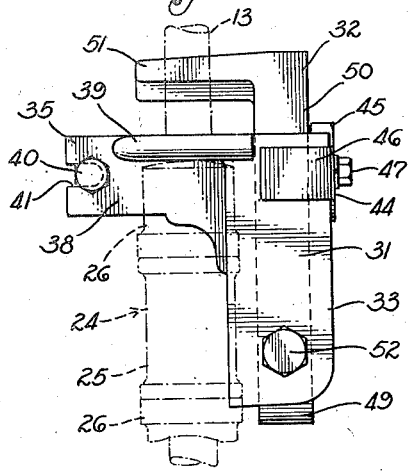
Fig. 5 is a view similar to Fig. 3 showing the adjustment tool in reverse position.

The operation of the tool may be readily understood from the foregoing description. Prior to applying the tool to a steering-knuckle support, the bolt 40 is removed from the ends of the engagement arms and the cap-screw 52 is retracted to permit the lateral extension 51 of the bending lever to swing to one side of the engagement recess 36. If it is desired to increase the camber of the front wheel 27, the tool is slipped into operative position from the front, the tool then being located and disposed as indicated in Figs. 2, 3, and 4. The bolt 40 for reinforcing the two engagement arms 35 is then replaced if such a bolt is employed, and then the operator uses a suitable wrench to thread the cap-screw 52 toward the lower arm 49 of the bending lever. It is apparent that the two engagement arms rigidly embrace one portion of the steering-knuckle support and the lateral extension 51 at the top of the lever presses against the side of a second portion of the steering-knuckle support when the cap-screw is rotated against the bending lever. The wedging of the steering-knuckle support into the engagement recess prevents relative movement between the tool and the engaged portion of the support in a plane transverse of the engagement arms. Continued rotation of the cap-screw causes sufficient force to be exerted by the bending arm to cause the wheel support to yield beween the portion embraced by the engagement arms and the second portion spaced thereabove that is subject to lateral pressure from the bending lever. The operator of the tool is in a position to observe the bending effect and to measure the resultant camber of the wheel. It is obvious that the corrective procedure may be carried out with dispatch. If it is desired to bend the steering-knuckle support in the opposite direction to decrease the camber of the front wheel 27, the operator applied the tool from the rear, as indicated in Fig. 5, and then manipulates the tool as described.

The preferred form of my invention described in specific detail herein for the purpose of disclosure and to illustrate the principles involved will suggest to those skilled in the art various changes, modifications, and substitutions that do not depart from my inventive concept, and I reserve the right to all such changes, modifications, and substitutions that properly come within the scope of my appended claims.

I claim as my invention:

1. A tool for bending the steering-knuckle support connected with the steering-knuckle in an individual front wheel suspension, said tool comprising: a body member adapted to extend longitudinally of said support; a pair of spaced engagement arms extending laterally from said body member for contact with opposite sides of a portion of said support to hold said portion and said body in fixed relation to each other, each of said arms being dimensioned to extend along the side of said support that is connected with said steering-knuckle whereby engagement of the arms with the support may be made from either the front or the rear of the support; a lever member pivotally mounted on said body member, said lever member having an upper arm extending above one of said engagement arms for contact with a second portion of said support, said lever member having a lower arm extending below said engagement arms; and screw means mounted on one of said members to act against the other member to rotate said lever member and thereby force said upper arm of the lever member against said second portion of the support.

2. A tool as set forth in claim 1 in which said two engagement arms have diverging opposed faces for engagement with steering-knuckle supports of various cross-sectional dimensions, and in which said upper arm of the lever member extends laterally to cooperate in the bending of such variously dimensioned supports.

3. A tool as set forth in claim 1 in which said arms diverge for engagement with steering-knuckle supports of various cross-sectional dimensions, and in which means is provided to releasably interconnect the outer ends of said engagement arms for mutual reinforcement in the course of a bending operation.

4. A tool as set forth in claim 1 in which each of said engagement arms includes a laterally extending reinforcing web disposed to rest on said steering-knuckle when the engagement arm is on the steering-knuckle side of said support.

5. A tool as set forth in claim 1 in which each of said arms is angular in cross section each of said arms having one wing dimensioned to fit between said support and said steering-knuckle and a second wing dimensioned to extend over the steering-knuckle.

6. A tool for bending the steering-knuckle support connected with the steering-knuckle in an individual front wheel suspension, said tool comprising: a body adapted to extend longitudinally of said support, said body having an integral reinforcing wing positioned to extend away from said support; a pair of spaced engagement arms extending laterally from said body for engagement with a portion of said support to hold said portion and body in fixed relation; a bending lever pivotally mounted on said body for rotation toward and away from said reinforcement wing of the body, said lever having an arm positioned to contact a second portion of said support spaced longitudinally of the support from said first portion; and screw means mounted in said reinforcing wing of said body to act between said body and said lever to rotate the lever with bending force.

7. A tool for bending the steering-knuckle support connected with the steering-knuckle in an individual front wheel suspension, said tool comprising: a body adapted to extend longitudinally of said support, said body having an integral reinforcing wing positioned to extend away from said support; a pair of spaced engagement arms extending laterally from said body for engagement with a portion of said steering-knuckle support, each of said engagement arms being of angular cross section to extend both alongside and over said steering-knuckle when the engagement arm is on the steering-knuckle side of the steering-knuckle support, said arms being disposed to hold said body against rotation relative to said engaged portion of the steering-knuckle support; a bending lever pivotally mounted on said body for rotation toward and away from said reinforcement of the body, said lever having a relatively short upper arm disposed to swing laterally against a second portion of said support spaced longitudinally of the support from said first portion, said lever having a relatively long lower arm disposed to move toward and away from said reinforcing wing of the body; and screw means mounted in said reinforcing wing of the body to force said lower arm of the lever away from said wing thereby to force said upper arm of the lever against said second portion of the support with bending force.

ROBERT C. HINTON.